(12) United States Patent
Kohara et al.

(10) Patent No.: US 7,077,450 B2
(45) Date of Patent: Jul. 18, 2006

(54) SOUND-ABSORBING MATERIAL FOR VEHICLE'S LOWER PORTION

(75) Inventors: Yoshihiro Kohara, Hiroshima (JP); Tatsuo Kobayashi, Hiroshima (JP); Syuuji Raisu, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 55 days.

(21) Appl. No.: 10/749,667

(22) Filed: Dec. 30, 2003

(65) Prior Publication Data
US 2004/0221514 A1 Nov. 11, 2004

Related U.S. Application Data

(63) Continuation-in-part of application No. 10/147,750, filed on May 17, 2002, now abandoned.

(30) Foreign Application Priority Data
Sep. 10, 2001 (JP) .............................. P2001-273455

(51) Int. Cl.
*B60J 10/08* (2006.01)
(52) U.S. Cl. ............... 296/39.3; 296/146.9; 296/146.1; 49/502
(58) Field of Classification Search ............... 296/39.9, 296/146.9, 154, 152, 146.5, 146.7, 146.1; 49/502, 475.1, 484.1
See application file for complete search history.

(56) References Cited

U.S. PATENT DOCUMENTS

| | | | | |
|---|---|---|---|---|
| 2,208,723 A | * | 7/1940 | Doty | 296/199 |
| 4,277,099 A | * | 7/1981 | Klein et al. | 296/146.9 |
| 4,362,427 A | * | 12/1982 | Mass et al. | 404/64 |
| 5,347,759 A | * | 9/1994 | Kobayashi et al. | 49/496.1 |
| 5,560,967 A | * | 10/1996 | Isaksen | 428/71 |
| 6,106,045 A | * | 8/2000 | Gac et al. | 296/39.1 |
| 6,131,341 A | * | 10/2000 | Wade et al. | 49/478.1 |
| 6,197,403 B1 | * | 3/2001 | Brown et al. | 428/137 |
| 6,367,865 B1 | * | 4/2002 | Royse | 296/146.9 |
| 6,386,619 B1 | * | 5/2002 | Tsuchida | 296/146.9 |
| 6,397,525 B1 | * | 6/2002 | Ishibashi et al. | 49/484.1 |
| 6,433,090 B1 | * | 8/2002 | Ellul et al. | 525/191 |
| 6,487,819 B1 | * | 12/2002 | Goldberg et al. | 49/478.1 |
| 6,601,346 B1 | * | 8/2003 | Nozaki | 49/498.1 |
| 6,668,489 B1 | * | 12/2003 | Baba et al. | 49/498.1 |
| 6,779,831 B1 | * | 8/2004 | Moriyama | 296/146.9 |

* cited by examiner

*Primary Examiner*—D. Glenn Dayoan
*Assistant Examiner*—Greg Blankenship
(74) *Attorney, Agent, or Firm*—Frishauf, Holtz, Goodman & Chick, P.C.

(57) ABSTRACT

A sound-absorbing material is attached to the bottom edge of a periphery of the lower portion of a car door 30. The material is positioned above the seal member 1 which makes a resilient contact with a body panel 20, and carries out the seal between the outside and the inside of the car. The material is made of a foam 10 having specific gravity of about 0.05–0.4. The material restrains the noise. The foam 10 may be provided with a plurality of protrusions 12 on the surface thereof, or it may be provided with a hollow part 13 along the longitudinal direction thereof.

12 Claims, 8 Drawing Sheets

Fig. 1
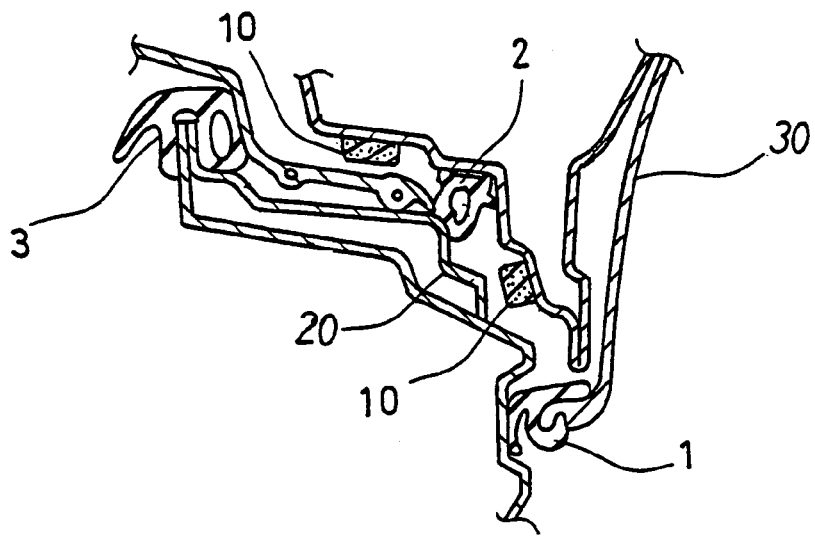
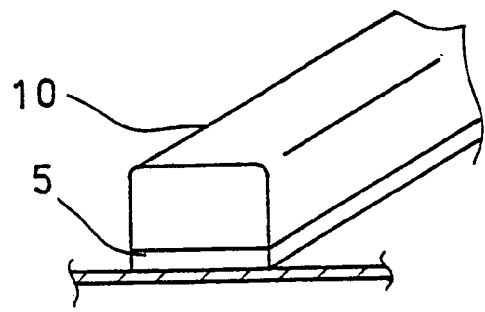
Fig. 2(a)
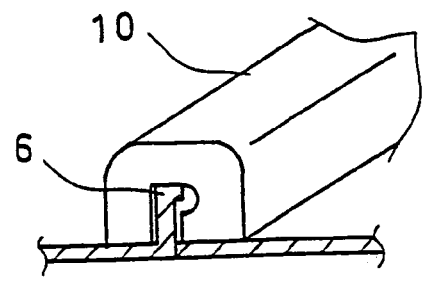
Fig. 2(b)
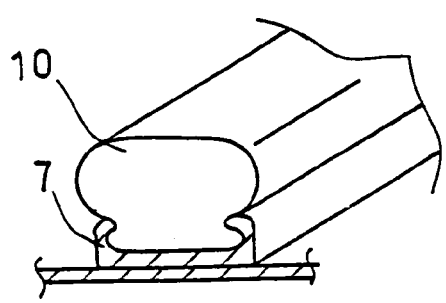
Fig. 2(c)
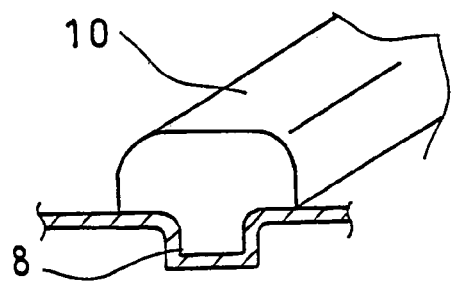
Fig. 2(d)

SOUND-ABSORBING MATERIAL FOR VEHICLE'S LOWER PORTION

CROSS-REFERENCE TO RELATED APPLICATIONS

This is a continuation-in-part of U.S. patent application Ser. No. 10/147,750 filed May 17, 2002, now abandoned the entire contents of which are incorporated herein by reference.

This application is based upon and claims the benefit of priority under 35 USC 119 of prior Japanese Patent Application No. 2001-273455 filed Sep. 10, 2001.

BACKGROUND OF THE INVENTION

This invention relates to a sound-absorbing material adapted to be attached to the lower portion of a car door.

As illustrated in FIGS. 6 and 7, a seal member 1 is provided at the bottom edge of a perimeter of the lower portion of a car door 30, which makes a resilient contact with the body panel 20 and provides a seal between the outside and inside of the car. A number of seal members can be attached to the body panel. There is a type which is attached to the upper inside of the seal member 1, or a type which is attached to the body panel 20 side of the seal member 1. (Such types are indicated as the seal member 2 and 3 in FIG. 7). FIG. 7 is an enlarged vertical section view along line I—I of FIG. 6.

Since there is a space between the door 30 and the body panel 20, it is difficult to fully prevent penetration noise from penetrating from the outside to the inside of the car (or from the inside to the outside of the car) by only providing the above-mentioned conventional seal members 1, 2 and 3. The penetration noise includes noise such as music produced inside the car which penetrates to the outside of the car.

An object of the present invention is to provide a sound-absorbing material for a vehicle's lower portion, which can effectively reduce the noise penetrating from the outside to the inside of the car and from the inside to the outside of the car.

SUMMARY OF THE INVENTION

In order to achieve the aforementioned object, according to a first aspect of the invention, the sound-absorbing material is attached to the bottom edge of a periphery of the lower portion of a car door 30. The material is positioned above the seal member 1 which makes resilient contact with a body panel 20, and carries out the seal between the outside and the inside of the car. The material is made of a foam 10 having specific gravity of about 0.05–0.4. The material reduces transmission of noise.

According to a second aspect of the invention, the sound-absorbing material is attached to the bottom edge of a periphery of the lower portion of a car door 30. The material is positioned above the seal member which makes resilient contact with a body panel 20 and carries out the seal between the inside and the outside of the car. The material comprises a sound absorption layer made of a foam 10 having specific gravity of 0.05–0.4, and a noise insulation layer 11 having specific gravity of 0.4 or more. The material restrains the noise.

According to a third aspect of the invention, the sound-absorbing material according to the first or second aspect of the invention is formed so as not to make a resilient contact with the body panel 20 while the door is closed.

According to a fourth aspect of the invention, the sound-absorbing material according to the first, second or third aspect of the invention includes a plurality of protrusions 12 on the surface thereof.

According to a fifth aspect of the invention, the sound-absorbing material for a vehicle's lower portion according to the first, second, third or fourth aspect of the invention includes a hollow part 13 along the longitudinal direction thereof.

According to a sixth aspect of the invention, the sound-absorbing material for a vehicle's lower portion according to the fifth aspect of the invention is filled with a particulate powder or a fibrous material.

According to the first aspect of the invention, the sound-absorbing material is disposed above the seal member which carries out the seal between the outside and the inside of the car, so that the space between a door and a body panel becomes smaller, and the noise transmitting through the space decreases.

Since the sound-absorbing material is made of a foam having specific gravity of about 0.05–0.4, the noise transmitting through the space is reduced.

According to the second aspect of the invention, the sound-absorbing material for a vehicle's lower portion includes a noise insulation layer in addition to a sound absorption layer, so that the noise transmission is more effectively reduced.

According to the third aspect of the invention, the sound absorbing-material for a vehicle's lower portion is formed so as not to make a direct resilient contact with the body panel while the door is closed. Therefore, the sound-absorbing material does not provide a reaction force which would occur if the foam joined the seal member by resilient contact, and the door closing performance does not degrade.

According to the fourth and fifth aspects of the invention, the sound-absorbing material for a vehicle's lower portion includes a plurality of protrusions on the surface thereof, or it includes a hollow part, so that the surface area of the material increases as compared with one having a smooth surface, and the sound absorption effect of the sound-absorbing material improves.

According to the sixth aspect of the invention, the hollow part of the sound-absorbing material is filled with a particulate powder or fibrous materials which increase the sound absorption effect.

BRIEF DESCRIPTION OF THE DRAWINGS

FIG. 1 is a vertical section view along line I—I of FIG. 6, which illustrates a condition where an embodiment of the sound-absorbing material for a vehicle's lower portion according to the present invention is attached to a car.

FIGS. 2(a)–2(d) are perspective views showing the wearing methods of the preferred embodiment of the sound-absorbing material for a vehicle's lower portion according to the present invention.

DETAILED DESCRIPTION OF THE PREFERRED EMBODIMENTS

Figure 6:
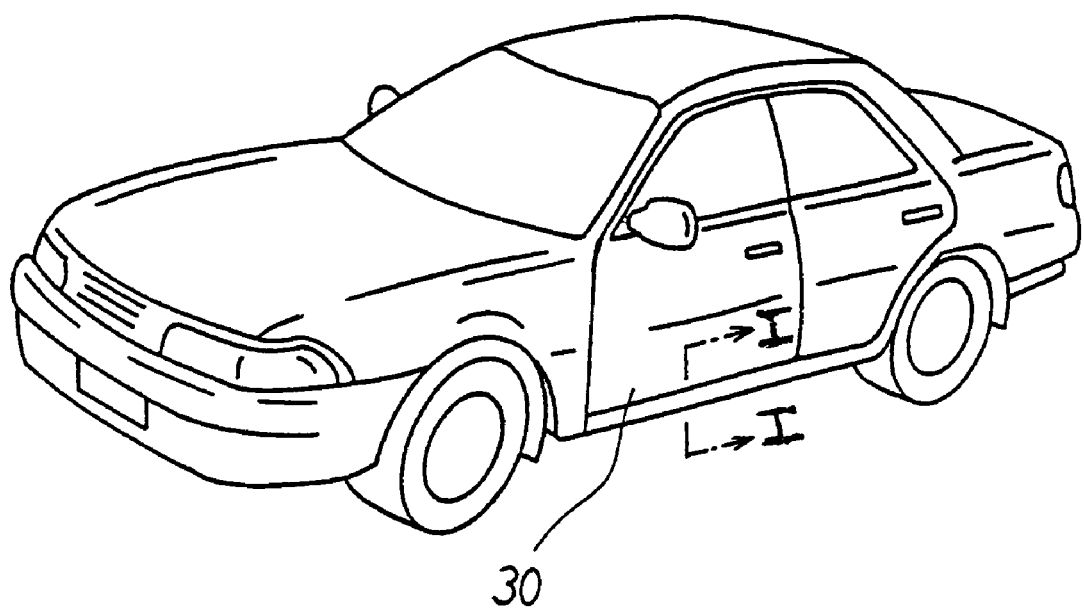
FIG. 6 is a perspective view of a car.
Figure 7:
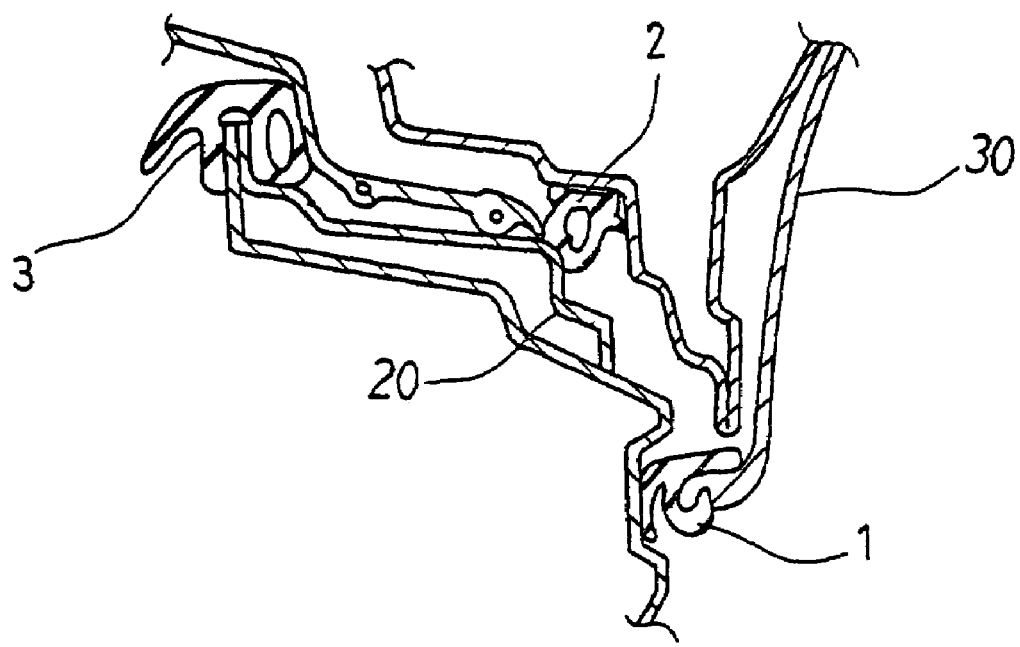
FIG. 7 is an enlarged section view along line I—I of FIG. 6, showing the composition of a vehicle lower part as a conventional example.
Figure 8:
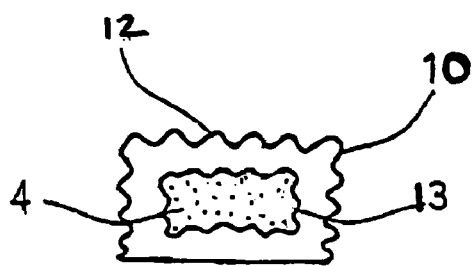
FIGS. 8(a)–8(d) are sectional views showing other embodiments of the sound-absorbing material for a vehicle's lower portion according to the present invention.
Figure 8:
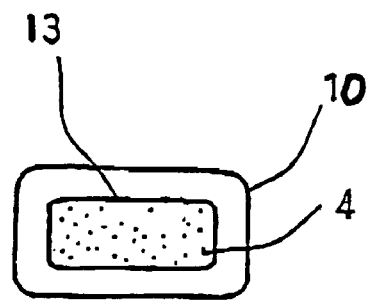
Figure 8:
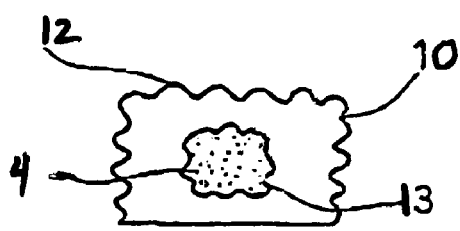
Figure 8:
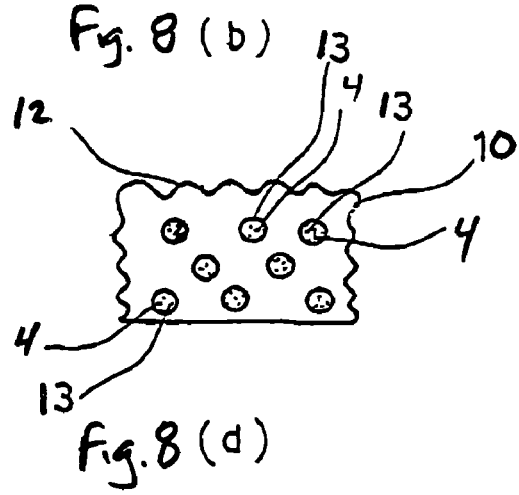

A preferred embodiment of the present invention will be described below referring to the drawings. The same numerals are given to the identical portions as the conventional example. FIG. 1 is a vertical section view along line I—I of FIG. 6, which illustrates an embodiment of a sound-absorbing material for a vehicle's lower portion according to the present invention which is attached to a car.

As shown in FIG. 1, a seal member 1 is attached to the bottom edge of a periphery of the lower part of a car door 30, making resilient contact with the body panel 20 while the door is closed. The seal member 1 makes the seal between the inside and the outside of the car.

At an inner upper side of the seal member 1, a second seal member 2 is attached, which also makes resilient contact with the body panel 20 while the door closed. Furthermore, a third seal member 3 is attached to the body panel 20 side.

Two pieces of foam 10 are provided at the lower part of the door above the seal member 1. Specifically, one is attached between the seal members 1 and 2, and the other is attached at an inner upper side of the seal member 2. Although two pieces of foam 10 are provided in this embodiment, it is also sufficient to provide one piece or three pieces of foam or more. This foam 10 is utilized to effectively reduce the transmission of noise from the inside to the outside of the car, or from the outside to the inside of the car. The foam 10 is arranged approximately parallel to the door surface similar to the seal members 1 and 2.

As shown in FIG. 2(a), the foam 10 may be mounted through the aid of an adhesion material 5 attached to the bottom of the foam 10, or as shown FIGS. 2(b) and 2(c), it may be fitted to a flange 6 (FIG. 2(b)) or rail 7 (FIG. 2(c)) formed in the door panel. Further, as shown in FIG. 2(d), the foam 10 may be fitted into a recess 8 which is formed by transforming the door panel.

The foam 10 has a specific gravity of about 0.05–0.4. The foam is mounted to the body panel 20 so as to provide a space between the foam 10 and the body panel 20 while the door is closed (so that the foam 10 does not make resilient contact with the body panel 20 (See FIG. 1)).

The space is provided so that the foam does not interfere with the closing of the door. If the foam 10 makes resilient contact with the body panel 20, a reaction force of the foam 10 joins the reaction force of the seal members 1 and 2. As a result, the closing of the the door is made difficult and performance is uneasy. The space between the foam and the body panel prevents such trouble. It is ideal to make the space zero (zero touch setup) between the foam 10 and the body panel 20 in order to lessen the noise. (The "zero touch setup" means a condition where the foam 10 nearly touches the body panel 20.) However, when variations in accuracy of fittings are considered, it has been found to be beneficial to provide some space. (Of course, if there are no variations, a zero touch setup can be considered.)

Figure 3:
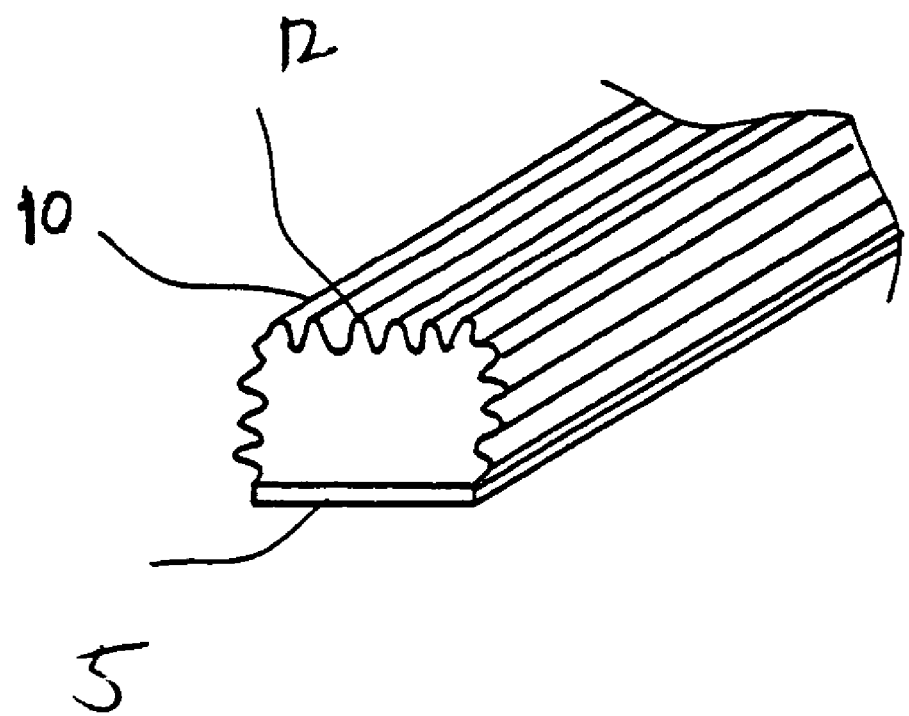
FIG. 3 is a perspective view showing another embodiment of the sound-absorbing material for a vehicle's lower portion according to the present invention.

As shown in FIGS. 2(a)–2(d), the foam 10 may be provided with a smooth surface, or, as shown in FIG. 3, it may be provided with a plurality of protrusions 12 on the surface thereof. By providing a plurality of protrusions 12, the surface area of the foam 10 increases as compared with one having a smooth surface, and thus, the sound absorption effect improves. The protrusions 12 can be made in various modes by changing the height and contiguity interval between each protrusion.

Figure 4:
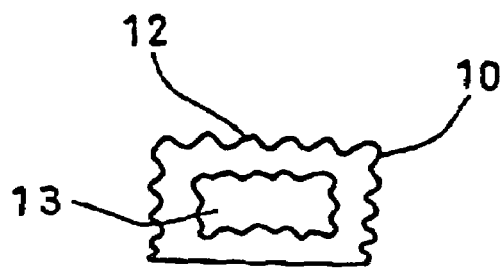
FIGS. 4(a)–4(d) are sectional views showing other embodiments of the sound-absorbing material for a vehicle's lower portion according to the present invention.
Figure 4:
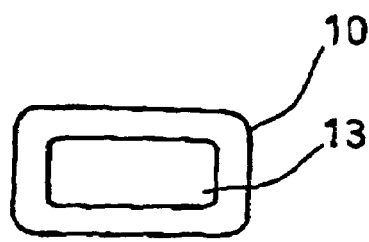
Figure 4:
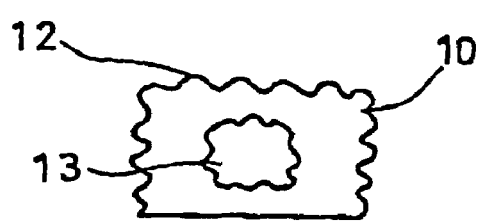
Figure 4:
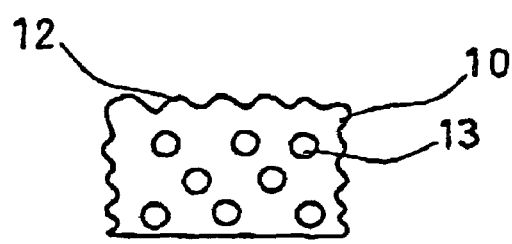
Figure 5A:
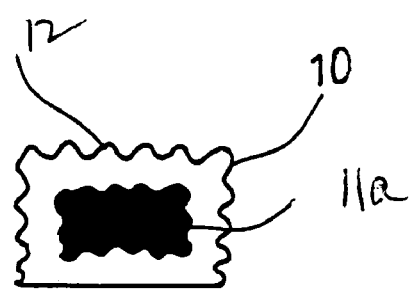
FIGS. 5(a)–5(d) are sectional views showing other embodiments of the sound-absorbing material for a vehicle's lower portion according to the present invention.
Figure 5B:
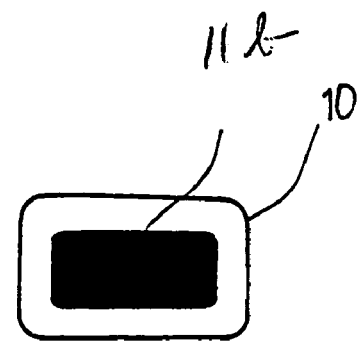
Figure 5C:
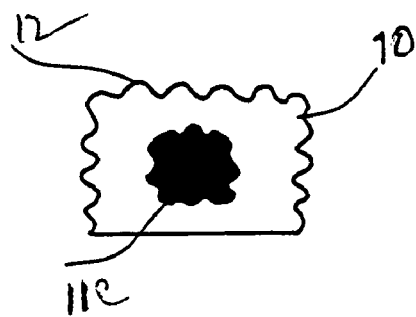
Figure 5D:
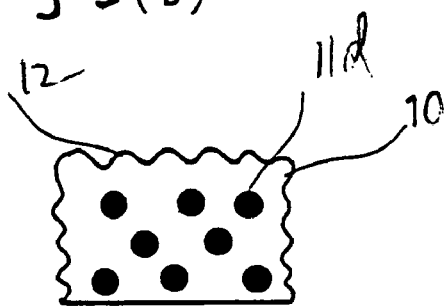

Further, as shown in FIGS. 4(a)–4(d), a hollow part 13 may be formed in the foam 10 along its longitudinal direction. By providing the hollow part 13, the surface area also increases as compared to one having a smooth surface like the protrusions 12 described above, and the sound absorption effect improves. It has been found that the energy of the noise that enters the hollow part 13 is attenuated by the internal air layer. As shown in FIGS. 4(a), 4(b) and 4(c), the hollow part 13 can have various configurations, and as shown in FIG. 4(d), it may even include a plurality of hollow parts 13.

Furthermore, as shown in FIGS. 5(a)–5(d) and 9(a)–9(d), a noise insulation layer 11a–11d, respectively, having a specific gravity of 0.4 or more may be added and multilayered to a sound absorption layer 10 having a specific gravity of 0.05–0.4, so that it restrains the noise from the point of both the sound absorption effect and the noise insulation effect.

This preferred embodiment of the invention exhibits the sound-absorbing material which is attached to the door side of the car, but the same sound absorption effect is acquired even if it is attached to the body side of the car.

As described hereinbefore, according to the preferred embodiment of the invention, the sound-absorbing material for a vehicle's lower portion is provided above the seal member which carries out the seal between the inside and the outside of the car, so that the space between the door and the body panel becomes smaller, and the noise penetrating through the space decreases. Since the sound-absorbing material is made of a foam having specific gravity of about 0.05–0.4, the noise penetrating through the space is reduced.

Therefore, the environment inside the car improves by reducing the penetration of noise from outside, while noise such as music produced inside the car is prevented from being transmitted outside the car.

According to another embodiment of the invention, the noise insulation layer is provided in addition to the sound absorption layer, so that it can reduce transmission of the noise through the door much more effectively.

Further, according to another embodiment of the invention, the sound-absorbing material for a vehicle's lower portion is included so as not to make resilient contact with the body panel in the closed door position. Therefore, the sound absorbing material does not inhibit the closing of the door by joining reaction forces with the seal member.

Furthermore, according to another embodiment of the invention, the sound-absorbing material includes a plurality of protrusions on the surface thereof, or it includes a hollow part, so that the surface area increases as compared with one having a smooth surface, and the sound absorption effect improves.

Referring now to FIGS. 8(a)–8(d) which are variations of the embodiments shown in FIGS. 4(a)–4(d), the hollow part 13 formed in the foam 10 may be filled (either partly or completely) with a particulate powder 4 (for example, carbon black and the like) or a fibrous material (for example, glass wool and the like) along its longitudinal direction to provide an increased sound absorbing effect. The energy of the noise that enters the hollow part 13 is attenuated by the particulate powder or fibrous material. As shown in FIGS. 8(*a*), 8(*b*) and 8(*c*), the hollow part 13 which includes the particulate powder or fibrous material has various forms, and as shown in FIG. 8(*d*), it may be provided with a plurality of hollow parts 13 which include the particulate powder or fibrous material therein.

Figure 9:
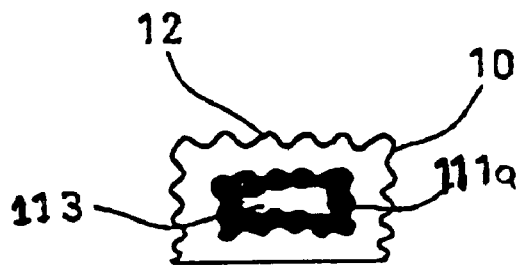
FIGS. 9(a)–9(d) are sectional views showing other embodiments of the sound-absorbing material for a vehicle's lower portion according to the present invention.
Figure 9:
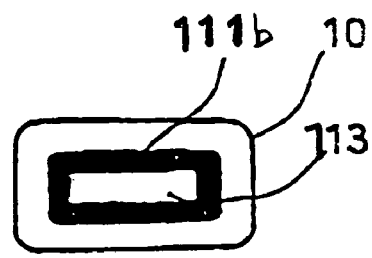
Figure 9:
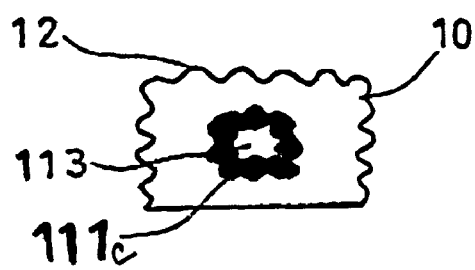
Figure 9:
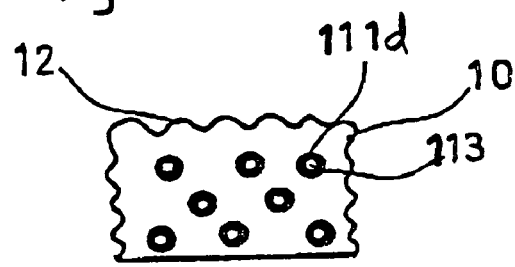

Referring now to FIGS. 9(*a*)–9(*d*), which is a variation of the embodiments shown in FIGS. 5(*a*)–5(*d*), a noise insulation layer 111*a*–111*d* respectively, having a specific gravity of 0.4 or more may have a hollow part 113 formed therein so that it restrains the noise from the point of both the sound absorption effect and the noise insulation effect. It is foreseen that the particulate powder or fibrous material discussed in connection with FIGS. 8(*a*)–8(*d*) could be introduced into the hollow part 113 of FIGS. 9(*a*)–9(*d*) to increase the sound absorption and noise insulation effect.

While illustrative embodiments of the present invention have been shown and described, numerous variations and alternate embodiments will occur to those skilled in the art, without departing the spirit and scope of the invention. Accordingly, it is intended that the present invention not be limited solely to the specifically described illustrative embodiment. Various modifications are contemplated and can be made without departing from the spirit and scope of the invention as defined by the appended claims.

What is claimed is:

1. A sound-absorbing material for a vehicle's lower portion, wherein the material is attached to a bottom edge of a periphery of a lower portion of a door of the vehicle, said material being equipped above a seal member which makes a resilient contact with a body panel of the vehicle and carries out a seal between the inside and the outside of the vehicle, said material being made of a foam having a specific gravity of about 0.05–0.4, and said material being able to restrain noise, and wherein said material is formed to make no contact with the body panel while the door is closed.

2. A sound-absorbing material for a vehicle's lower portion as claimed in claim 1, wherein said material comprises a plurality of protrusions on the surface thereof.

3. A sound-absorbing material for a vehicle's lower portion as claimed in claim 1, wherein said material comprises a hollow part along the longitudinal direction thereof.

4. A sound-absorbing material for a vehicle's lower portion as claimed in claim 3, further comprising at least one of a particulate powder or a fibrous material disposed within the hollow part.

5. A sound-absorbing material for a vehicle's lower portion as claimed in claim 2, wherein said material comprises a hollow part along the longitudinal direction thereof.

6. A sound-absorbing material for a vehicle's lower portion, wherein the material is attached to a bottom edge of a periphery of a lower portion of a door of the vehicle, said material being equipped above a seal member which makes a resilient contact with a body panel of the vehicle and carries out a seal between the inside and the outside of the vehicle, said material comprising a sound absorption layer made of a foam having a specific gravity of 0.05–0.4, and a noise insulation layer having a specific gravity of 0.4 or more, and said material being able to restrain noise, and wherein said material is formed to make no contact with the body panel while the door is closed.

7. A sound-absorbing material for a vehicle's lower portion as claimed in claim 6, wherein said material comprises a plurality of protrusions on the surface thereof.

8. A sound-absorbing material for a vehicle's lower portion as claimed in claim 7, wherein said material comprises a hollow part along the longitudinal direction thereof.

9. A sound-absorbing material for a vehicle's lower portion as claimed in claim 6, wherein said material comprises a hollow part along the longitudinal direction thereof.

10. A sound-absorbing material for a vehicle's lower portion, which is attached to a bottom edge of a periphery of a lower portion of a vehicle door, said material being provided above a seal member which makes a resilient contact with a body panel of the vehicle and which carries out a seal between the inside and the outside of the vehicle, and said material comprising a foam having a specific gravity of about 0.05–0.4, and said material restraining penetration of noise into and out of the vehicle, wherein said material is formed to be spaced from and to make no contact with a body panel of the vehicle when the door is closed, wherein said material comprises a plurality of protrusions on an outer surface thereof, and wherein at least some of said plurality of protrusions face said body panel of the vehicle.

11. A sound-absorbing material for a vehicle's lower portion as claimed in claim 10, wherein said material is elongated and comprises a hollow part extending along the longitudinal direction thereof.

12. A sound-absorbing material for a vehicle's lower portion which is attached to a bottom edge of a periphery of a lower portion of a vehicle door, and said material being provided above a seal member which makes a resilient contact with a body panel of the vehicle and which carries out a seal between the inside and the outside of the vehicle, wherein said material comprises a sound absorption layer made of a foam having a specific gravity of about 0.05–0.4, and a noise insulation layer having specific gravity of about 0.4 or more, and said material restraining penetration of noise into and out of the vehicle, wherein said material is formed to be spaced from and to make no contact with a body panel of the vehicle when the door is closed, wherein said material comprises a plurality of protrusions on an outer surface thereof, and wherein at least some of said plurality of protrusions face said body panel of the vehicle.

* * * * *